(12) United States Patent
Sathi et al.

(10) Patent No.: US 11,032,223 B2
(45) Date of Patent: *Jun. 8, 2021

(54) FILTERING ELECTRONIC MESSAGES

(71) Applicant: Slice Technologies, Inc., San Mateo, CA (US)

(72) Inventors: Conal Sathi, Mountain View, CA (US); Alexander Tarasov, Odessa (UA); Dmytro Mykhaylov, San Jose, CA (US); Narine Kokhlikyan, Sunnyvale, CA (US); Roman Ivchenko, Odessa (UA)

(73) Assignee: Rakuten Marketing LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,183

(22) Filed: Oct. 1, 2019

(65) Prior Publication Data

US 2020/0036666 A1    Jan. 30, 2020

Related U.S. Application Data

(63) Continuation of application No. 15/597,404, filed on May 17, 2017, now Pat. No. 10,447,635.

(51) Int. Cl.
  *G06F 16/30* (2019.01)
  *H04L 12/58* (2006.01)
  (Continued)

(52) U.S. Cl.
  CPC ............ *H04L 51/12* (2013.01); *G06F 16/355* (2019.01); *G06N 20/00* (2019.01); *G06F 16/9535* (2019.01); *G06Q 10/107* (2013.01)

(58) Field of Classification Search
  CPC ................... G06F 16/9558; G06F 16/9535
  (Continued)

(56) References Cited

U.S. PATENT DOCUMENTS

| 5,664,109 A | 9/1997 | Johnson et al. |
| 5,864,848 A | 1/1999 | Horvitz et al. |

(Continued)

FOREIGN PATENT DOCUMENTS

| EP | 1139264 | 10/2001 |
| JP | 2002014681 | 1/2002 |

(Continued)

*Primary Examiner* — Sana A Al-Hashemi
(74) *Attorney, Agent, or Firm* — Lessani Law Group, PC

(57) ABSTRACT

Improved systems and methods for automatically discovering and filtering electronic messages. These systems and methods improve the operation of computer apparatus to achieve dramatic reductions in processing resources, data storage resources, network resources, and filter production times compared to conventional approaches. In some examples, improvements result from configuring computer apparatus to perform a unique sequence of specific electronic message processing rules in a network communications environment. In this regard, these examples are able to automatically learn the structures and semantics of machine generated electronic message headers, accelerating the ability to support new message sources and new markets. These examples provide a purchase related electronic message discovery and filtering service that is able to identify and filter purchase related electronic messages with high accuracy across a wide variety of electronic message formats.

20 Claims, 10 Drawing Sheets

(51) Int. Cl.
*G06N 20/00* (2019.01)
*G06F 16/35* (2019.01)
*G06Q 10/10* (2012.01)
*G06F 16/9535* (2019.01)

(58) Field of Classification Search
USPC ........ 707/609, 687, 705, 769, 790, 813, 821
See application file for complete search history.

(56) References Cited

U.S. PATENT DOCUMENTS

| | | |
|---|---|---|
| 5,897,622 A | 4/1999 | Blinn et al. |
| 6,772,130 B1 | 8/2004 | Karbowski et al. |
| 7,082,426 B2 | 7/2006 | Musgrove et al. |
| 7,197,449 B2 | 3/2007 | Hu |
| 7,321,887 B2 | 1/2008 | Dorner et al. |
| 7,546,290 B2 | 6/2009 | Colando |
| 7,627,641 B2 | 12/2009 | Aslop |
| 7,685,276 B2 | 3/2010 | Konig et al. |
| 7,739,337 B1 | 6/2010 | Jensen |
| 7,747,693 B2 | 6/2010 | Banister |
| 7,783,515 B1 | 8/2010 | Kumar et al. |
| 7,788,262 B1 | 8/2010 | Shirwadkar |
| 7,809,824 B2 | 10/2010 | Wei et al. |
| 7,899,871 B1 | 3/2011 | Kumar |
| 7,917,548 B2 | 3/2011 | Gibson et al. |
| 8,046,797 B2 | 10/2011 | Bentolia et al. |
| 8,055,999 B2 | 11/2011 | Dames et al. |
| 8,078,619 B2 | 12/2011 | Bansal et al. |
| 8,095,597 B2 | 1/2012 | Rawat et al. |
| 8,230,323 B2 | 7/2012 | Bennett et al. |
| 8,233,751 B2 | 7/2012 | Patel et al. |
| 8,458,054 B1 | 6/2013 | Thakur |
| 8,489,689 B1 | 7/2013 | Sharma et al. |
| 8,527,436 B2 | 9/2013 | Salaka et al. |
| 8,560,621 B2 | 10/2013 | Rawat et al. |
| 8,666,812 B1 | 3/2014 | Gandhi |
| 8,676,815 B2 | 3/2014 | Deng |
| 8,738,477 B2 | 5/2014 | Lefebvre et al. |
| 8,744,948 B1 | 6/2014 | McVickar et al. |
| 8,812,417 B2 | 8/2014 | Martinez et al. |
| 8,819,109 B1 | 8/2014 | Krishnamurthy |
| 8,868,621 B2 | 10/2014 | D'Onofrio |
| 8,903,924 B2 | 12/2014 | Jensen et al. |
| 9,053,206 B2 | 6/2015 | Cai et al. |
| 9,268,860 B2 | 2/2016 | Lee et al. |
| 9,275,418 B2 | 3/2016 | Johansen et al. |
| 9,286,586 B2 | 3/2016 | Kern et al. |
| 9,305,263 B2 | 4/2016 | Horvitz et al. |
| 9,311,599 B1 | 4/2016 | Attenberg et al. |
| 9,313,166 B1 | 4/2016 | Zeng |
| 9,323,731 B1 | 4/2016 | Younes et al. |
| 9,436,738 B2 | 9/2016 | Ehsani et al. |
| 9,483,741 B2 | 11/2016 | Sun et al. |
| 9,508,054 B2 * | 11/2016 | Brady ................ G06F 16/9558 |
| 9,734,169 B2 | 8/2017 | Redlich |
| 9,767,419 B2 | 9/2017 | Venanzi et al. |
| 9,799,327 B1 | 10/2017 | Chan |
| 9,846,902 B2 * | 12/2017 | Brady ................ G06Q 30/0635 |
| 2001/0016819 A1 | 8/2001 | Kolls |
| 2002/0046248 A1 | 4/2002 | Drexler |
| 2002/0052847 A1 | 5/2002 | Shioda et al. |
| 2002/0065884 A1 | 5/2002 | Donoho et al. |
| 2002/0091776 A1 | 7/2002 | Nolan et al. |
| 2002/0143937 A1 | 10/2002 | Revashetti et al. |
| 2002/0156817 A1 | 10/2002 | Lemus |
| 2002/0174185 A1 | 11/2002 | Rawat et al. |
| 2003/0105681 A1 | 6/2003 | Oddo |
| 2004/0044587 A1 | 3/2004 | Schwartzman |
| 2004/0044674 A1 | 3/2004 | Mohammadioun et al. |
| 2004/0064373 A1 | 4/2004 | Shannon |
| 2004/0117615 A1 | 6/2004 | Wilks |
| 2004/0177120 A1 | 9/2004 | Kirsch |
| 2004/0199595 A1 | 10/2004 | Banister et al. |
| 2004/0205737 A1 | 10/2004 | Margaliot et al. |
| 2004/0220926 A1 | 11/2004 | Lamkin et al. |
| 2004/0230647 A1 | 11/2004 | Rawat et al. |
| 2005/0050099 A1 | 3/2005 | Bleistein et al. |
| 2005/0055290 A1 | 3/2005 | Bross et al. |
| 2005/0131764 A1 | 6/2005 | Pearson et al. |
| 2005/0177785 A1 | 8/2005 | Shrader |
| 2005/0184152 A1 | 8/2005 | Bomitz |
| 2005/0210016 A1 | 9/2005 | Brunecky |
| 2005/0246269 A1 | 11/2005 | Smith |
| 2006/0026152 A1 | 2/2006 | Zeng et al. |
| 2006/0088214 A1 | 4/2006 | Handley et al. |
| 2006/0122899 A1 | 6/2006 | Lee et al. |
| 2006/0143158 A1 | 6/2006 | Ruhl et al. |
| 2006/0206063 A1 | 9/2006 | Cao |
| 2006/0206306 A1 | 9/2006 | Cao et al. |
| 2006/0265396 A1 | 11/2006 | Raman et al. |
| 2006/0282442 A1 | 12/2006 | Lennon et al. |
| 2006/0288268 A1 | 12/2006 | Srinivasan et al. |
| 2007/0069013 A1 | 3/2007 | Seifert et al. |
| 2007/0073580 A1 | 3/2007 | Perry et al. |
| 2007/0073592 A1 | 3/2007 | Perry et al. |
| 2007/0156732 A1 | 7/2007 | Surendran et al. |
| 2007/0168464 A1 | 7/2007 | Noonan |
| 2007/0185865 A1 | 8/2007 | Budzik et al. |
| 2007/0198727 A1 | 8/2007 | Guan |
| 2007/0250390 A1 | 10/2007 | Lee et al. |
| 2007/0294127 A1 | 12/2007 | Livov |
| 2008/0033831 A1 | 2/2008 | Boss et al. |
| 2008/0072140 A1 | 3/2008 | Vydiswaran |
| 2008/0073429 A1 | 3/2008 | Oesterling et al. |
| 2008/0098300 A1 | 4/2008 | Corrales et al. |
| 2008/0147525 A1 | 6/2008 | Allen et al. |
| 2008/0228466 A1 | 9/2008 | Sudhakar |
| 2008/0262940 A1 | 10/2008 | Kovach |
| 2008/0288486 A1 | 11/2008 | Kim et al. |
| 2008/0306831 A1 | 12/2008 | Abraham |
| 2008/0306968 A1 | 12/2008 | Nandhra |
| 2008/0307046 A1 | 12/2008 | Baek et al. |
| 2009/0089209 A1 | 4/2009 | Bixler et al. |
| 2009/0171906 A1 | 7/2009 | Adams et al. |
| 2009/0204545 A1 | 8/2009 | Barsukov |
| 2009/0299887 A1 | 12/2009 | Shiran |
| 2009/0300482 A1 | 12/2009 | Summers et al. |
| 2009/0313101 A1 | 12/2009 | McKenna et al. |
| 2009/0313132 A1 | 12/2009 | McKenna et al. |
| 2009/0327268 A1 | 12/2009 | Denney et al. |
| 2010/0037177 A1 | 2/2010 | Golsorkhi |
| 2010/0082754 A1 | 4/2010 | Bryan |
| 2010/0083095 A1 | 4/2010 | Nikovski et al. |
| 2010/0121775 A1 | 5/2010 | Keener |
| 2010/0161527 A1 | 6/2010 | Sellamanickam et al. |
| 2010/0257066 A1 | 10/2010 | Jones et al. |
| 2011/0078724 A1 | 3/2011 | Mehta et al. |
| 2011/0191206 A1 | 8/2011 | Kiarostami |
| 2011/0191693 A1 | 8/2011 | Baggett et al. |
| 2011/0208787 A1 | 8/2011 | Sidy |
| 2011/0246239 A1 | 10/2011 | Vdovjak et al. |
| 2011/0282734 A1 | 11/2011 | Zurada |
| 2012/0029963 A1 | 2/2012 | Olding et al. |
| 2012/0047014 A1 | 2/2012 | Smadja et al. |
| 2012/0059859 A1 | 3/2012 | Jiao et al. |
| 2012/0089903 A1 | 4/2012 | Liu et al. |
| 2012/0191585 A1 | 7/2012 | Lefebvre et al. |
| 2012/0203632 A1 | 8/2012 | Blum et al. |
| 2012/0203733 A1 | 8/2012 | Zhang |
| 2012/0231969 A1 | 9/2012 | He et al. |
| 2012/0239650 A1 | 9/2012 | Kim et al. |
| 2012/0259882 A1 | 10/2012 | Thakur et al. |
| 2012/0284081 A1 | 11/2012 | Cheng et al. |
| 2012/0284150 A1 | 11/2012 | Stanley |
| 2012/0290609 A1 | 11/2012 | Britt |
| 2012/0303411 A1 | 11/2012 | Chen |
| 2012/0303758 A1 | 11/2012 | Anbarasan et al. |
| 2012/0330971 A1 | 12/2012 | Thomas et al. |
| 2013/0009774 A1 | 1/2013 | Sabeta |
| 2013/0024282 A1 | 1/2013 | Kansal |
| 2013/0024525 A1 | 1/2013 | Brady et al. |
| 2013/0024924 A1 | 1/2013 | Brady et al. |
| 2013/0124376 A1 | 5/2013 | Lefebvre et al. |

(56) References Cited

U.S. PATENT DOCUMENTS

| | | |
|---|---|---|
| 2013/0145255 A1 | 6/2013 | Zheng et al. |
| 2013/0151631 A1 | 6/2013 | Jensen et al. |
| 2013/0191723 A1 | 7/2013 | Pappas et al. |
| 2013/0228839 A1 | 10/2013 | Lefebvre et al. |
| 2013/0339145 A1 | 12/2013 | Blum et al. |
| 2014/0067633 A1 | 3/2014 | Venkatasubramanian et al. |
| 2014/0105508 A1 | 4/2014 | Arora |
| 2014/0172767 A1 | 6/2014 | Chen et al. |
| 2014/0189808 A1 | 7/2014 | Mahaffey et al. |
| 2014/0201126 A1* | 7/2014 | Zadeh .................... A61B 5/165 706/52 |
| 2014/0229160 A1 | 8/2014 | Galle |
| 2014/0236577 A1 | 8/2014 | Malon et al. |
| 2014/0358814 A1 | 12/2014 | Brady et al. |
| 2015/0095017 A1 | 4/2015 | Mnih et al. |
| 2015/0169522 A1 | 6/2015 | Logan et al. |
| 2015/0235166 A1 | 8/2015 | Brady et al. |
| 2015/0235301 A1 | 8/2015 | Brady et al. |
| 2015/0295869 A1 | 10/2015 | Li et al. |
| 2016/0104188 A1 | 4/2016 | Glyman et al. |
| 2016/0110762 A1 | 4/2016 | Mastierov et al. |
| 2016/0110763 A1 | 4/2016 | Mastierov et al. |
| 2016/0117316 A1 | 4/2016 | Le et al. |
| 2016/0180215 A1 | 6/2016 | Vinyals |
| 2016/0232440 A1 | 8/2016 | Gregor et al. |
| 2016/0247061 A1 | 8/2016 | Trask et al. |
| 2017/0011289 A1 | 1/2017 | Gao et al. |
| 2017/0017635 A1 | 1/2017 | Leliwa et al. |
| 2017/0032035 A1 | 2/2017 | Gao et al. |
| 2017/0076196 A1 | 3/2017 | Sainath et al. |
| 2017/0140753 A1 | 5/2017 | Jaitly et al. |
| 2017/0154258 A1 | 6/2017 | Liu et al. |
| 2017/0154295 A1 | 6/2017 | Fang |
| 2017/0192956 A1 | 7/2017 | Kaiser et al. |
| 2017/0200076 A1 | 7/2017 | Vinyals et al. |
| 2017/0235848 A1 | 8/2017 | Dusen et al. |
| 2017/0270100 A1 | 9/2017 | Audhkhasi et al. |
| 2017/0270409 A1 | 9/2017 | Trischler et al. |

FOREIGN PATENT DOCUMENTS

| | | |
|---|---|---|
| KR | 20140138512 | 12/2014 |
| WO | 200137540 | 5/2001 |
| WO | 2016064679 | 4/2016 |
| WO | 2017083752 | 5/2017 |
| WO | 2017090051 | 6/2017 |

\* cited by examiner

```
                                    /-32
    ┌─────────────────────────────────────────────┐
    │ From: sales@merchant.com                    │
    │ To: bob@mailserver.com                      ╲ 34
    │ Date: Sat, Feb 11, 2017 at 1:42 PM          │
    │ Subject: Bob, thank you for your order      │
    │           ⋮                                  │
    ├─────────────────────────────────────────────┤
36 ──┤ Dear Bob,                                   │
    │                                             │
37 ──┤ Thank you for placing your order with      │
    │ Merchant. Most orders are processed and    │
    │ shipped within one business day. We'll     │
    │ send you a tracking number once your item  │
    │ has shipped.                                │
    │                                             │
38 ──┤ Order Number: #1925391                     │
    │                                             │
40 ──┤ Order Summary                              │
42 ──┤ Product Subtotal: $83.97                   ╲ 35
44 ──┤ Discounts: -$30.00                         │
46 ──┤ Shipping Charges: $0.00                    │
48 ──┤ Tax: $3.64                                 │
50 ──┤ Total: $57.61                              │
    │                                             │
    │   WeareverBrake Rotor – Rear                │
52 ──┤ Part No 10-0623YF                          │
    │   1 YEAR REPLACEMENT IF DEFECTIVE           │
    │   1                                         │
54 ──┤ Product Price $20.99                       │
56 ──┤ Discount -$7.50                            │
    │ $20.99                                      │
    │                                             │
    │   WagnerThermoQuiet Brake Pads – Rear       │
58 ──┤ Part No QC537                              │
    │   LIMITED LIFETIME REPLACEMENT              │
    │   1                                         │
60 ──┤ Product Price $41.99                       │
62 ──┤ Discount -$15.00                           │
    │ $41.99                                      │
    └─────────────────────────────────────────────┘
```

FIG. 3

FILTERING ELECTRONIC MESSAGES

CROSS-REFERENCE TO RELATED APPLICATIONS

This application is a continuation of U.S. patent application Ser. No. 15/597,404, filed May 17, 2017. This application also relates to the following co-pending applications: U.S. patent application Ser. No. 13/185,943 (U.S. Pat. No. 8,844,010), filed Jul. 19, 2011; U.S. patent application Ser. No. 13/349,287, filed Jan. 12, 2012; U.S. patent application Ser. No. 14/457,421 (U.S. Pat. No. 9,641,474), filed Aug. 12, 2014; U.S. patent application Ser. No. 14/684,954, filed Apr. 13, 2015 (U.S. Pat. No. 9,508,054); U.S. patent application Ser. No. 14/684,658, filed Apr. 13, 2015 (U.S. Pat. No. 9,563,915); U.S. patent application Ser. No. 14/519,919, filed Oct. 21, 2014 (U.S. Pat. No. 9,563,904); U.S. patent application Ser. No. 14/519,975, filed Oct. 21, 2014; International Patent Application No. PCT/US15/56013, filed Oct. 16, 2015; U.S. patent application Ser. No. 15/277,933, filed Sep. 27, 2016; U.S. patent application Ser. No. 15/420,096, filed Jan. 31, 2017; and U.S. patent application Ser. No. 15/422,999, filed Feb. 2, 2017.

BACKGROUND

People purchase products from many different merchants using a variety of different payment options. The transactions for these purchases typically are confirmed by physical in-store receipts or by electronic confirmation messages that are addressed to the purchasers' messaging accounts (e.g., a purchaser's electronic mail account). The large number and diversity of confirmation messages makes it difficult for people to track their purchases and obtain a comprehensive understanding of their purchase histories. In addition, the large diversity of merchants from which people purchase products makes it difficult for merchants to obtain sufficient purchase history data to develop accurate customer profiles. Even assuming that a person uses a common identifier (e.g., a loyalty card or credit card) for all his or her purchases, these purchases typically are tracked only by the merchant that issued the identifier to the customer. This lack of customer information limits the ability to effectively determine customers' cross-merchant purchase transaction information.

In an effort to ameliorate these problems, reporting systems have been developed to extract purchase related information from data sources that are published directly by merchants to consumers, such as purchase confirmation messages and shipping confirmation messages.

SUMMARY

The invention features a method, performed by computer apparatus, for processing a population of electronic messages transmitted between network nodes and stored in association with respective user accounts on one or more network data storage systems managed by one or more messaging servers, each electronic message being associated with a respective sender, a respective header, and a respective body. In accordance with this method, headers in the population that are stored on one or more of the network data storage systems are fetched by a client network node from one or more of the messaging servers, across multiple of the user accounts. For each of one or more senders, the fetched headers that are associated with the sender are grouped into clusters based on a density based clustering process that correlates the clusters with respective dense regions in a clustering data space in which the fetched headers are separated from one another based on similarities between respective pairs of the fetched headers. For each of one or more of the clusters, a respective sample of the electronic messages in the population that are associated with the fetched headers in the cluster and stored on one or more of the network data storage systems are retrieved by a client network node from one or more of the messaging servers. Each electronic message in the retrieved sample is classified by a machine learning classifier with a respective label from a predefined set of labels comprising one or more purchase related labels and an associated confidence level to create a respective classification data set for the cluster. The cluster is assigned a respective cluster label selected from the predefined set of labels based on at least one cluster classification rule that maps the respective classification data set to the respective cluster label. For each of one or more clusters assigned a respective one of the purchase related labels, a respective filter for filtering purchase related electronic messages is automatically generated.

The invention also features a method, performed by computer apparatus, for processing a population of electronic messages transmitted between network nodes and stored in association with respective user accounts on one or more network data storage systems managed by one or more messaging servers, each electronic message being associated with a respective sender, a respective header, and a respective body. In accordance with this method, for each of one or more senders, headers in the population are fetched from one or more of the network data storage systems. For each of one or more senders, the fetched headers are grouped into clusters. The process of grouping the fetched headers comprises assigning ones of the fetched headers to respective ones of the clusters based on similarities between the headers in the clusters without regard to any message body content. For each of one or more of the clusters, a respective sample of one or more of the electronic messages associated with the fetched headers assigned to the cluster is retrieved from one or more of the network data storage systems, and the cluster is designated by a machine learning classifier as either receipt-related or not-receipt-related based on header and body content of the one or more retrieved electronic messages in the sample. A respective electronic message filter is automatically generated for each of one or more of the clusters designated as receipt-related, wherein each electronic message filter defines a respective rule for matching a respective pattern of subject field strings in a header of an electronic message.

In some examples one or more of the filters are installed by a processor in at least one network communication channel to select purchase related electronic messages from a set of electronic messages stored in association with respective user accounts on one or more network data storage systems managed by one or more messaging servers.

The invention also features computer apparatus operable to implement the methods described above and computer-readable media storing computer-readable instructions causing computer apparatus to implement the methods described above.

DESCRIPTION OF DRAWINGS

FIG. 3 is a diagrammatic view of an example of an electronic message.

DETAILED DESCRIPTION

Figure 1:
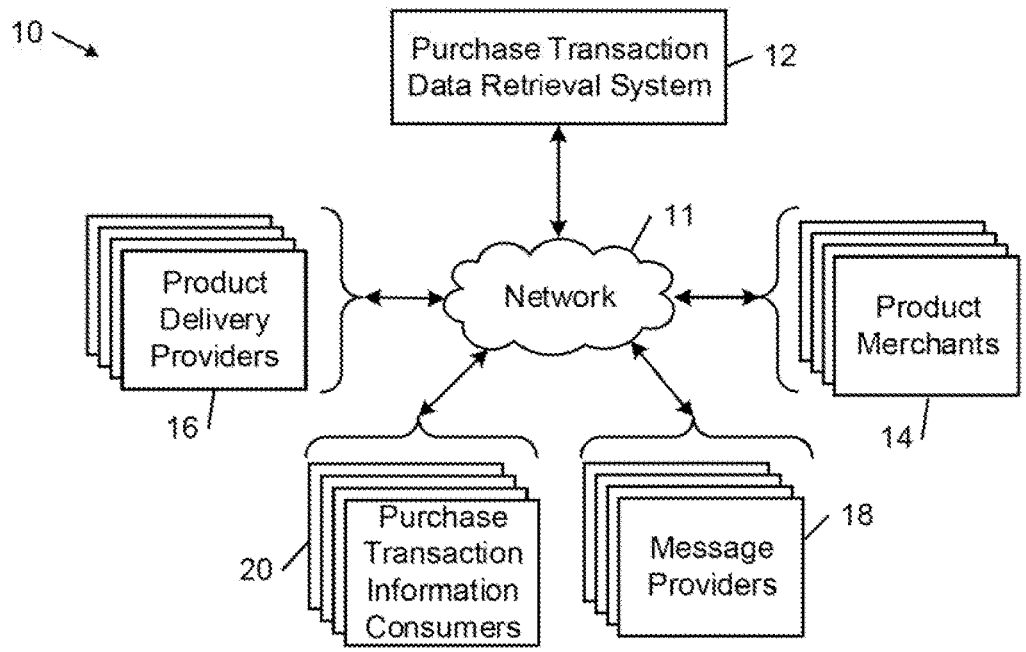
FIG. 1 is a diagrammatic view of an example of a network communication environment.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "product" is any tangible or intangible good or service that is available for purchase or use.

An "electronic message" is a persistent text based information record sent from a sender to a recipient between physical network nodes and stored in non-transitory computer-readable memory. An electronic message may be structured (e.g., a hypertext markup language (HTML) message that includes structured tag elements) or unstructured (e.g., a plain text message).

A "purchase related electronic message" is an electronic message that relates to purchasing a product. Examples of purchase related electronic messages include order confirmations, shipping confirmations, refunds, cancellations, backorders, coupons, and promotions.

A "sender domain" in an electronic message refers to the administrative realm for a messaging address from which the electronic message is sent. For example, an electronic message address may have a format "local-part@domain", where the "local-part" identifies the messaging address and the "domain" identifies the administrative realm for the messaging address. Multiple messaging addresses may share the same sender domain.

A "receipt" is an electronic message that confirms the status of a purchase of one or more products. Examples of receipts include order confirmation electronic messages and shipping confirmation electronic messages.

"Purchase transaction information" (also referred to as "purchase transaction data") is information related to the purchase of a product. Purchase transaction data includes, for example, invoice data, purchase confirmation data, product order information (e.g., merchant name, order number, order date, product description, product name, product quantity, product price, sales tax, shipping cost, and order total), and product shipping information (e.g., billing address, shipping company, shipping address, estimated shipping date, estimated delivery date, and tracking number).

A "computer" is any machine, device, or apparatus that processes data according to computer-readable instructions that are stored on a computer-readable medium either temporarily or permanently. "Computer apparatus" refers to one or more distinct computers. A "computer operating system" is a software component of a computer that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" (also referred to as "memory") refers to any tangible, non-transitory device capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "network node" is a physical junction or connection point in a communications network. Examples of network nodes include, but are not limited to, a terminal, a computer, and a network switch. A "server system" includes one or more network nodes and responds to requests for information or service. A "client node" is a network node that requests information or service from a server system.

As used herein, the term "includes" means includes but not limited to, the term "including" means including but not limited to. The term "based on" means based at least in part on.

II. Filtering Purchase Related Electronic Messages

A. Introduction

People send and receive nearly 200 billion emails per day worldwide. Only a small fraction of these emails, however, relate to purchases. As a result, substantial amounts of time and resources are needed to sift through users' message accounts to identify and retrieve purchase related emails in quantities that are sufficient to obtain current actionable information on a regular basis.

The examples that are described herein provide improved systems and methods for discovering and filtering purchase related electronic messages transmitted between physical network nodes to convey purchase related information to designated recipients. These systems and methods solve practical problems that have arisen as a result of the proliferation of different electronic message formats used by individual merchants and across different merchants. In this regard, these examples are able to automatically learn the structures and semantics of machine generated electronic message headers, which accelerates the ability to support new message sources, new markets, and different languages. These examples provide a purchase related electronic message discovery and filtering service that is able to identify and filter purchase related electronic messages with high accuracy across a wide variety of electronic message formats.

Examples that are described herein leverage insights regarding the distinctive structural features of machine-generated purchase related electronic messages to implement a process for automatically discovering and filtering purchase related electronic messages that improves the operation of computer apparatus to achieve dramatic reductions in processing resources, data storage resources, network resources, and filter production times compared to conventional approaches. In some examples, improvements result from configuring a computer apparatus to perform a unique sequence of specific electronic message processing rules in a network communications environment. In some examples, additional benefits over conventional approaches are realized by configuring the computer apparatus to automatically learn the individual peculiarities of different machine-generated purchase related electronic messages sent by different merchants and automatically adapt the processing to those peculiarities. Some examples, for instance, substantially increase the accuracy and efficiency of the message discovery process by automatically adjusting the operation of the computer apparatus to accommodate different levels of diversity in the respective templates used by different merchants to generate their respective sets of machine-generated purchase related electronic messages.

In specific examples, these systems and methods include improved special purpose computer apparatus programmed to automatically learn, from a set of electronic messages, an electronic message filter that matches to the headers of purchase related electronic messages that are generated by a machine according to a respective message template that defines the structural elements in the bodies of the purchase related electronic messages. These systems and methods also include improved special purpose computer apparatus programmed to install the learned electronic message filters in at least one network communication channel to select purchase related electronic messages from a set of electronic messages stored in association with respective user accounts on one or more network data storage systems managed by one or more messaging servers.

By these improved systems and methods, product purchase information can be identified and extracted from a wide variety of electronic message types and aggregated to provide individuals with enhanced tools for visualizing and organizing their purchase histories and to provide merchants and other organizations improved cross-merchant purchase information across different consumer demographics to enable targeted and less intrusive advertising and other marketing strategies. These improved systems and methods can be deployed to monitor consumer purchases over time to obtain updated purchase history information that can be aggregated for an individual consumer or across many consumers to provide actionable information that directs consumer behavior and organizational marketing strategies. For example, these improved systems and methods can organize disparate product purchase information extracted from individual electronic messages into actionable data that can be used by a consumer to organize her prior purchases and enhance her understanding of her purchasing behavior and can be used by merchants and other organizations to improve the accuracy and return-on-investment of their marketing campaigns.

B. Exemplary Operating Environment

FIG. 1 shows an example of a network communications environment 10 that includes a network 11 that interconnects a purchase transaction data retrieval system 12, one or more product merchants 14 that sell products, one or more product delivery providers 16 that deliver purchased products to purchasers, one or more message providers 18 that provide message handling services, and one or more purchase transaction information consumers 20 that purchase product and market information and services from the purchase transaction data retrieval system 12.

The network 11 may include any of a local area network (LAN), a metropolitan area network (MAN), and a wide area network (WAN) (e.g., the internet). The network 11 typically includes a number of different computing platforms and transport facilities that support the transmission of a wide variety of different media types (e.g., text, voice, audio, and video) between network nodes of the purchase transaction data retrieval system 12, the one or more product merchants 14, the product delivery providers 16, the message providers 18, and the purchase transaction information consumers 20. Each of the purchase transaction data retrieval system 12, the product merchants 14, the product delivery providers 16, the message providers 18, and the purchase transaction information consumers 20 typically connects to the network 11 via a network node (e.g., a client computer or server system) that includes a tangible computer-readable memory, a processor, and input/output (I/O) hardware (which may include a display).

One or more of the product merchants 14 typically allow individuals and businesses to purchase products directly over the network 11 using a network enabled software application, such as a web browser. One or more of the product merchants 14 also may allow individuals and businesses to purchase products in a physical retail establishment. In either case, after a purchase transaction has been completed, a product merchant 14 may send a product purchase confirmation electronic message to a messaging address associated with the product purchaser. The product purchase confirmation message may include, for example, product order information such as merchant name, order number, order date, estimated delivery date, product description, product name, product quantity, product price, sales tax, shipping cost, and order total. The product merchants 14 also may arrange to have the product delivered by one of the product delivery providers 16. Depending on the type of product that was purchased, the product delivery provider 16 may deliver the product to the purchaser physically or electronically. In either case, the product delivery provider 16 or the product merchant 14 may send a delivery notification electronic message to the messaging address associated with the purchaser. The delivery notification electronic message may include, for example, product shipping information such as product order information, billing address, shipping company, shipping address, estimated shipping date, estimated delivery date, and tracking number.

In general, the purchaser's messaging address may be any type of network address to which electronic messages may be sent. Examples of such messaging addresses include electronic mail (e-mail) addresses, text messaging addresses (e.g., a sender identifier, such as a telephone number or a user identifier for a texting service), a user identifier for a social networking service, and a facsimile telephone number. The purchase related electronic messages typically are routed to the purchaser through respective ones of the message providers 18 associated with the purchaser's messaging address. The message providers 18 typically store the purchaser's electronic messages in a respective message folder in association with the purchaser's messaging address on one or more network data storage systems managed by one or more messaging servers.

The purchase transaction data retrieval system 12 extracts purchase transaction information from the electronic messages of product purchasers. In some examples, the purchase transaction data retrieval system obtains authorization from the product purchasers to access their respective message folders that are managed by the message providers 18. In other examples, product purchasers allow the purchase transaction data retrieval system 12 to access their electronic messages that are stored on their local communication devices (e.g., personal computer or mobile phone).

Figure 2:
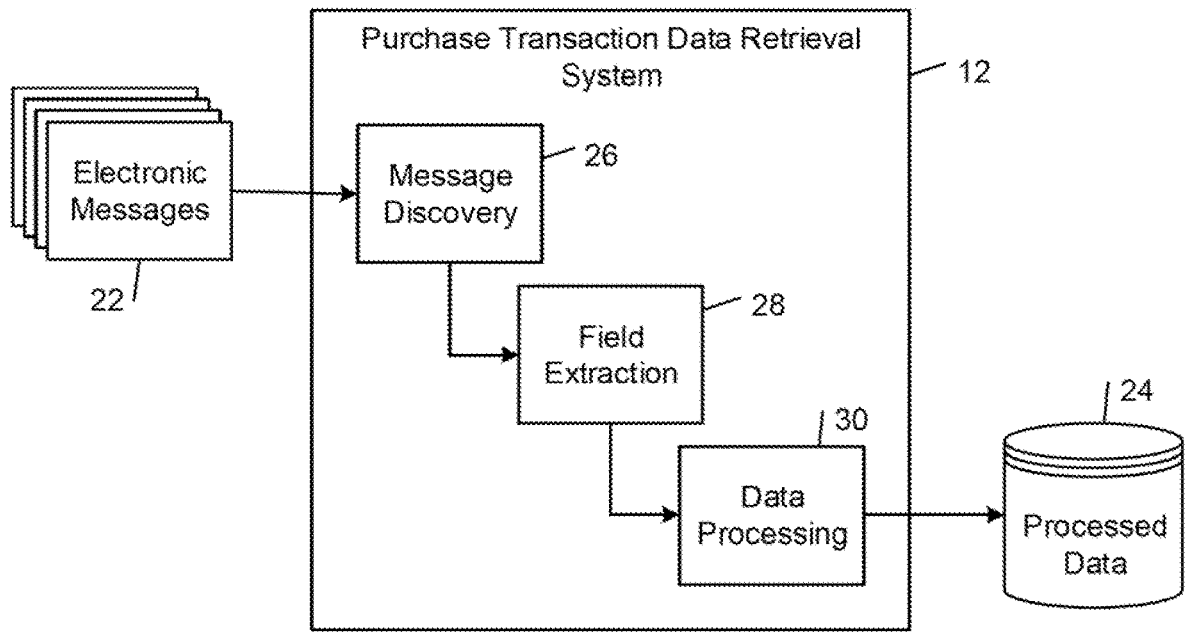
FIG. 2 is a diagrammatic overview of electronic message processing stages performed by an example of a purchase transaction data retrieval system.

Referring to FIG. 2, after obtaining authorization to access the electronic messages 22 of a purchaser, the purchase transaction data retrieval system 12 processes the electronic messages 22 through a number of stages before producing processed data 24 that is provided to the purchase transaction information consumers 20. These stages include a message discovery stage 26, a field extraction stage 28, and a data processing stage 30.

In the message discovery stage 26, the purchase transaction data retrieval system 12 identifies the electronic messages 22 that relate to product purchases. In some examples, rule-based filters and machine learning classifiers are used to identify purchase related electronic messages.

In the field extraction stage 28, the purchase transaction data retrieval system 12 extracts product purchase information from the identified ones of the electronic messages 22. Examples of such product purchase information include merchant name, order number, order date, product description, product name, product quantity, product price, sales tax, shipping cost, order total, billing address, shipping company, shipping address, estimated shipping date, estimated delivery date, and tracking number.

In the data processing stage 30, the purchase transaction data retrieval system 12 processes the extracted product purchase information according to the different types of purchase transaction information consumers 20. For example, for individual users, the extracted product purchase information is processed, for example, to display information about the users' purchases, including information for tracking in-transit orders, information for accessing purchase details, and aggregate purchase summary information. For advertisers, the extracted product purchase information is processed, for example, to assist in targeting advertising to consumers based on their purchase histories. For market analysts, the extracted product purchase information is processed to provide, for example, anonymous item-level purchase detail across retailers, categories, and devices.

C. Discovering and Filtering Purchase Related Electronic Messages

In the examples explained in detail below, the purchase transaction information data retrieval system 12 includes a filter learning system that automatically learns electronic message filters that match the headers of respective sets of similar purchase related electronic messages, such as sets of electronic messages that are generated by a machine according to respective message templates that respectively define the structural elements of the purchase related electronic messages.

FIG. 3 shows an example of a confirmation electronic message 32 for a product order. The confirmation electronic message 32 includes a header 34 and a body 35. The header 34 includes the following standard structural elements: "From:"; "To:"; "Date:"; and "Subject". The header also includes one or more of the following structural elements, which are not shown in FIG. 3: "Cc:", "Content-Type", "Precedence:", "Message-ID:", "In-Reply-To:", "References:", "Reply-To:", "Archived-At:", "Received:", and "Return-Path:". The body 36 includes the following merchant-specific machine-generated structural elements: an introductory "Dear" 36; standard informational text 37 (i.e., "Thank you for placing your order . . . once your item has been shipped."); "Order Number:" 38; "Order Summary" 40; "Product Subtotal:" 42; "Discounts:"; "Shipping Charges:" 46; "Tax:" 48; "Total:" 50; "Part No" 52; "Product Price" 54; "Discount" 56; "Part No" 58; "Product Price" 60; and "Discount" 62. The structural elements 34-50 are static elements and the sets of structural elements 52-56 and 58-62 include the same static elements that repeat in respective iterating elements. The non-structural elements (e.g., prices, order number, and part numbers) of the electronic message are data fields that are extracted and classified by a parser component of the product purchase information provider 12.

Figure 4:
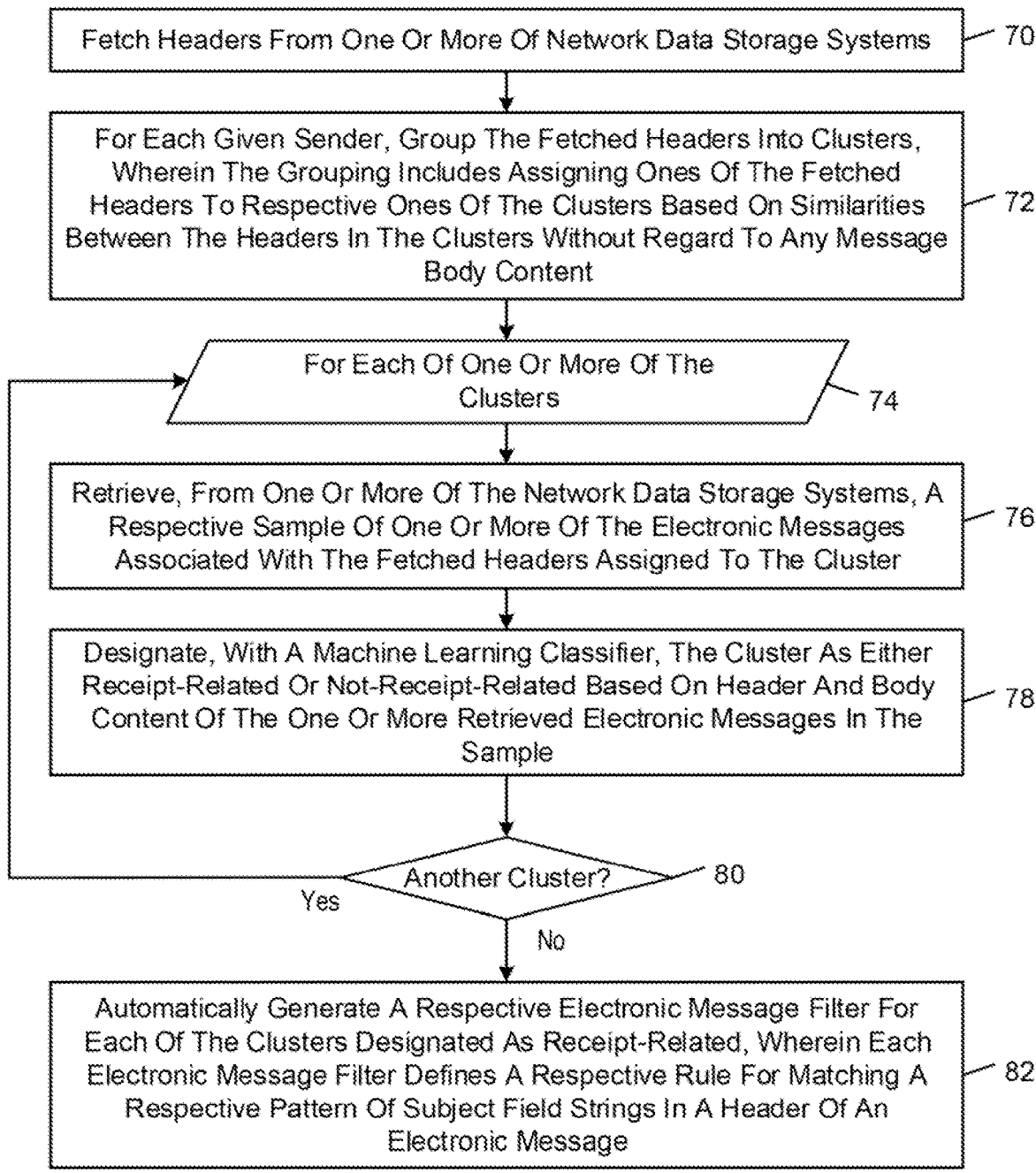
FIG. 4 is a flow diagram of an example of a process for generating an electronic message filter.

FIG. 4 shows an example of a method 66 of automatically building one or more electronic message filters. In accordance with this method, computer apparatus processes a population of electronic messages transmitted between network nodes and stored in association with respective user accounts on one or more network data storage systems managed by one or more messaging servers. Each of the electronic messages in the population is associated with a respective sender, a respective header, and a respective body.

In the illustrated example, the computer apparatus is programmed to perform the method of FIG. 4 for each of one or more electronic message senders (FIG. 4, block 68). A sender may correspond to a single electronic message address (e.g., sales@store.com) or a sender domain (e.g., *@store.com), which may be associated with multiple electronic messages addresses.

The computer apparatus fetches headers from one or more of the network data storage systems (FIG. 4, block 70). The fetched headers may be associated with a particular sender domain or may be fetched without regard to the sender domain. The computer apparatus groups the fetched headers into clusters (FIG. 4, block 72). In this process, for each sender, ones of the fetched headers are assigned to respective ones of the clusters based on similarities between the headers in the clusters without regard to any message body content. For each of one or more of the clusters (FIG. 4, blocks 74, 80), the computer apparatus retrieves, from one or more of the network data storage systems, a respective sample of one or more of the electronic messages associated with the fetched headers assigned to the cluster (FIG. 4, block 76). The computer apparatus also designates, with a machine learning classifier, the cluster as either receipt-related or not-receipt-related based on header and body content of the one or more retrieved electronic messages in the sample (FIG. 4, block 78). The computer apparatus automatically generates a respective electronic message filter for each of one or more of the clusters designated as receipt-related, where each electronic message filter defines a respective rule for matching a respective pattern of subject field strings in a header of an electronic message while crawling electronic messages stored in association with respective user accounts on one or more data storage systems managed by one or more network data storage systems (FIG. 4, block 82).

The approach illustrated in FIG. 4 involves three main stages: (i) a header structure learning stage that groups headers into clusters of electronic messages having similar structural elements; (ii) a sample-based classification stage that accurately identifies which of the clusters of headers correspond to one or more purchase related electronic message types; and (iii) a filter generation stage. Processing complete electronic messages (including, e.g., headers and bodies) consumes substantially more resources than processing the headers alone. Through sampling, the number of complete electronic messages that are retrieved and then processed in the classification stage can be significantly reduced. In this way, the method of FIG. 4 is able to achieve dramatic reductions in the processing resources, data storage resources, network resources, and filter production times required to build electronic message filters compared to conventional approaches. In addition, since the system only retrieves headers and a small sample of the complete electronic messages that correspond to header clusters (which typically correspond to machine-generated electronic messages, such as receipts), the system is unlikely to inadvertently retrieve users' personal electronic messages and thereby inherently protects user privacy.

This approach leverages the inherent structural nature of machine-generated electronic messages to produce high-accuracy filters even though the headers are classified based only on a sample of the complete electronic messages that are associated with each cluster. In particular, when applied to machine-generated electronic messages, the header structure learning stage can generate tight clusters of electronic message headers that are likely to have been produced by the same message template. As a result, only a few or even only one sample complete electronic message is needed to represent each cluster in the classification stage.

Figure 5:
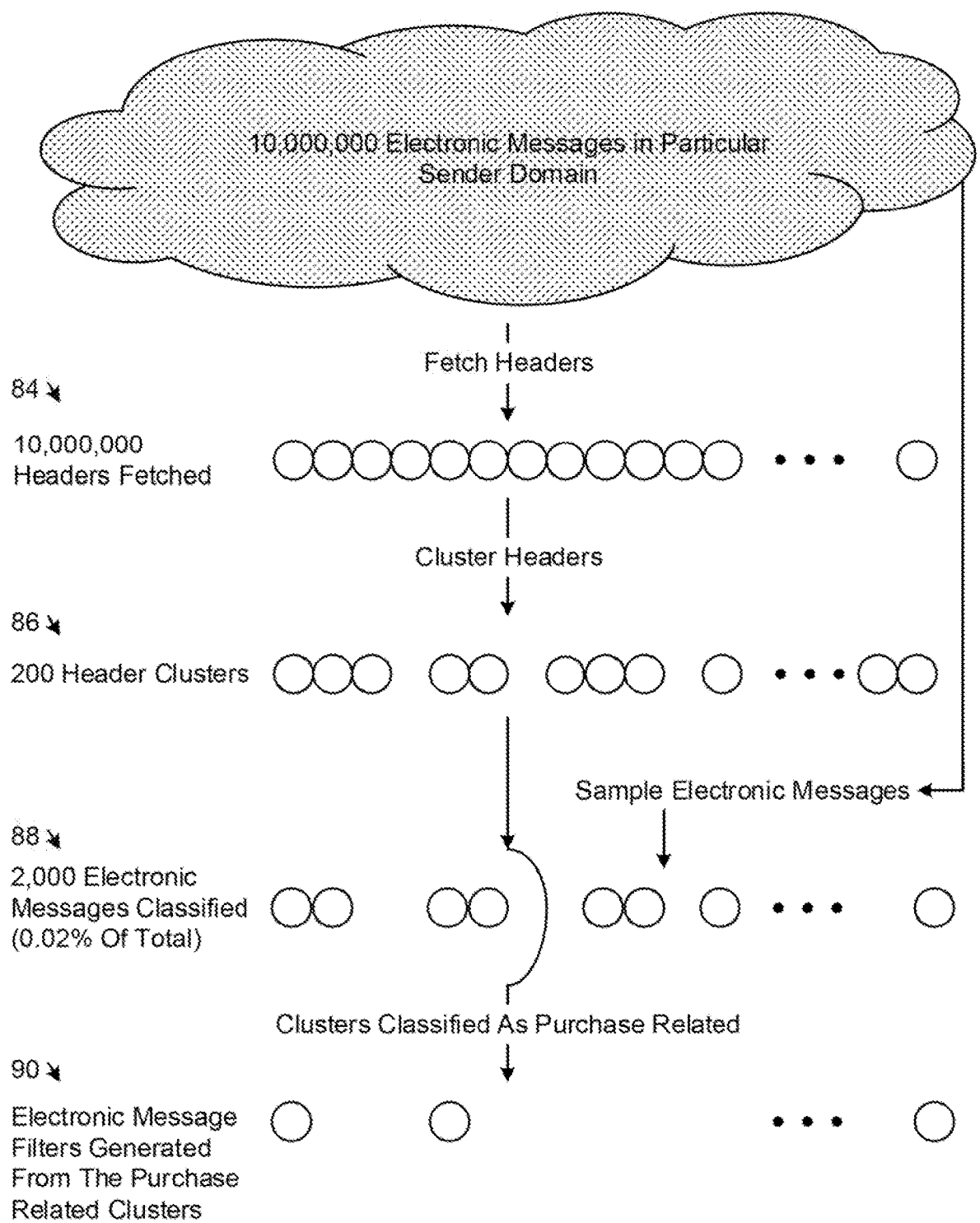
FIG. 5 is a diagrammatic view of data relating to different stages of the electronic message filter generation process of FIG. 4.

FIG. 5 shows an exemplary diagrammatic view of the data processed at different stages of the filter building method of FIG. 4. In this example, the fetching stage 84 involves fetching all 10 million of the headers in an example population of electronic messages that correspond to a particular sender domain. The clustering stage 86 involves clustering the 10 million headers into 200 header clusters. The cluster classification stage 88 involves retrieving 2000 complete electronic messages that correspond to a respective predetermined fixed size sample of 10 electronic messages for each of the 200 clusters, and classifying the respective electronic message sample with a machine learning classifier. The filter generation stage 90 involves building a respective filter for each cluster that is classified as being related to a purchase. Thus, in this hypothetical example, the number (i.e., 2000) of complete electronic messages that are processed to generate the electronic message filters amounts to only 0.02% of the total number of electronic messages in the population, which results in a dramatic reduction in processing resources, data storage resources, network resources, and filter production times compared to conventional approaches.

In some examples, these substantial benefits result, at least on part, from programming the computer apparatus with specific computer-readable instructions that improve the way in which the computer apparatus identifies purchase-related electronic messages headers. In some cases, the purchase-related header identification capabilities of the computer apparatus are by provisioning the computer apparatus with specific instructions that cause the computer apparatus to group electronic message headers into tight clusters and, subsequently, use a machine learning classifier to identify purchase-related header clusters based on a small sample of the complete electronic messages that are associated with each header cluster.

Figure 6:
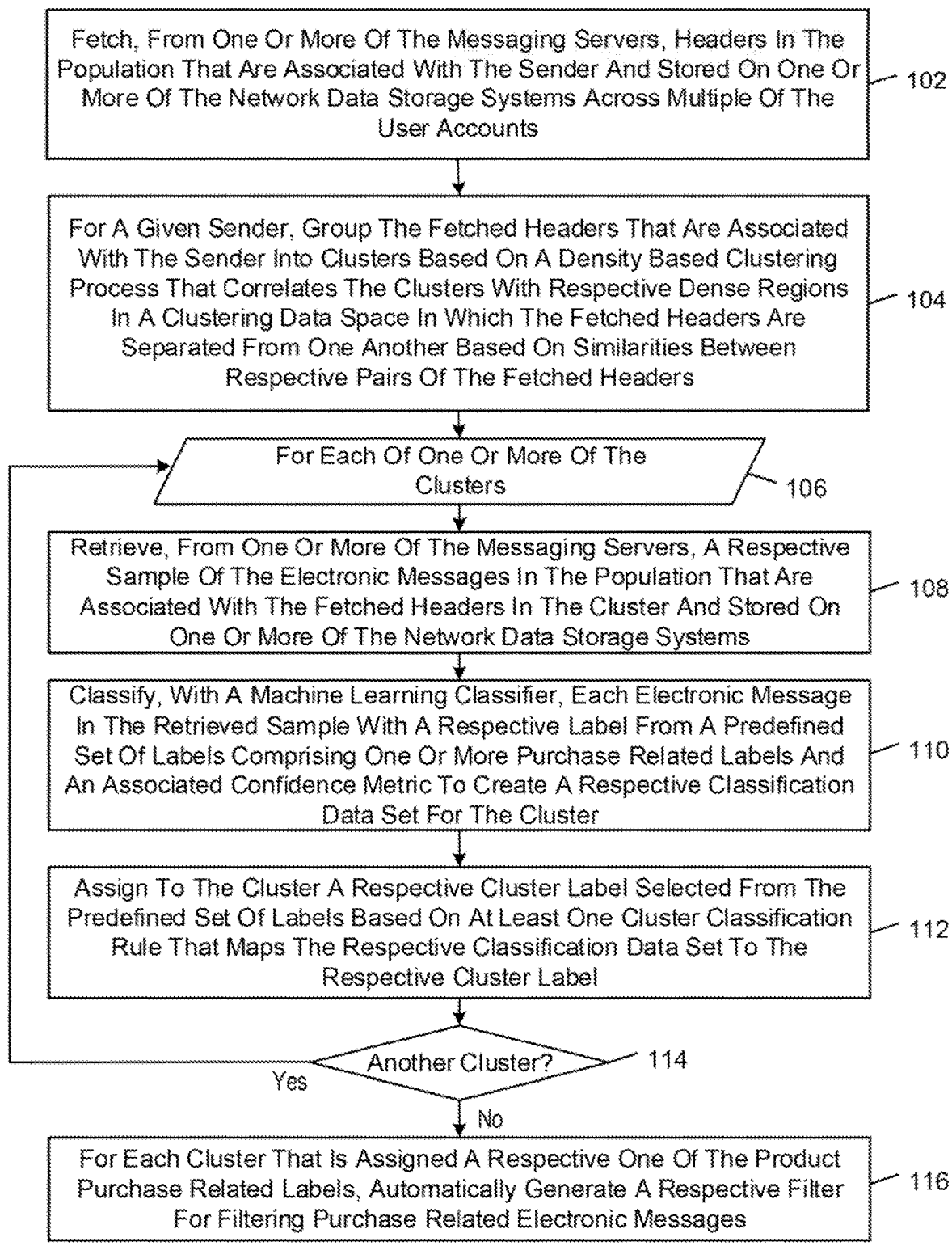
FIG. 6 is a flow diagram of an example of a process for generating an electronic message filter.

FIG. 6 shows a flow diagram of an example 98 of the electronic message filter building process of FIG. 4. In accordance with this method, computer apparatus processes a population of electronic messages transmitted between network nodes and stored in association with respective user accounts on one or more network data storage systems managed by one or more messaging servers. Each of the electronic messages in the population is associated with a respective sender, a respective header, and a respective body.

In this example, computer apparatus are programmed to perform one or more elements of the method of FIG. 6 based on electronic messages from one or more electronic message senders (FIG. 6, block 100). As mentioned above, a sender may correspond to a single electronic message address (e.g., sales@store.com) or to a sender domain (e.g., *@store.com), which may be associated with multiple electronic messages addresses.

In accordance with the method of FIG. 6, computer apparatus (e.g., a client network node) fetches, from one or more of the messaging servers, headers in the population that are associated with the sender and stored on one or more of the network data storage systems across multiple of the user accounts (FIG. 6, block 102). In some examples, the computer apparatus fetches all of the electronic message headers in the population of electronic messages. In other examples, the computer apparatus fetches one or more samples of the electronic message headers in the population.

Before fetching the headers, the computer apparatus typically obtains authorization to access the users' messaging accounts, either directly from the users or indirectly from a third party service, such as an access authorization service. The computer apparatus then uses the access authorization to fetch headers that are associated with the sender from the users' messaging accounts. In some examples, the computer apparatus implements an electronic message crawling engine that crawls the users' messaging accounts (e.g., by calling an electronic messaging API), and parses and evaluates contents of the electronic message headers. In some examples, the electronic message crawling engine parses one or both of the "From:" field and the "Subject:" field and applies one or more filters (e.g., regular expression filters) to the parsed results to identify the headers that correspond to the target sender.

Figure 8:
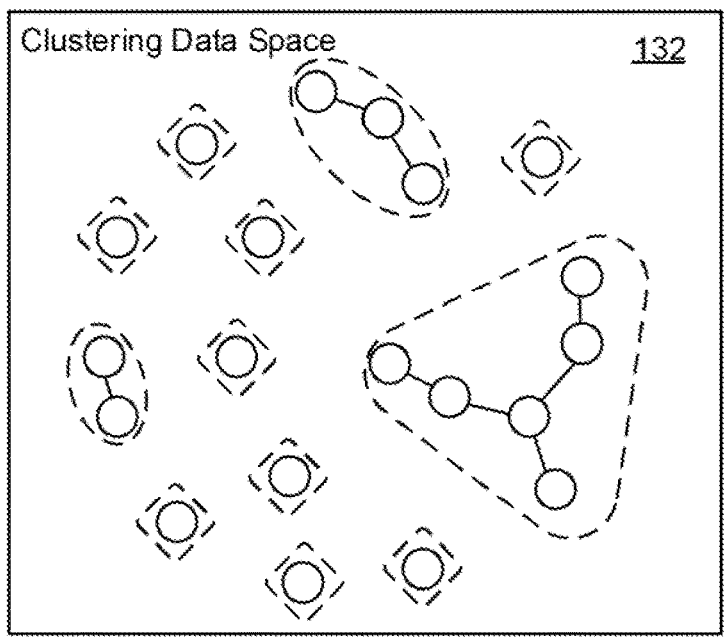
FIG. 8 is a diagrammatic view of an example of clusters of headers in a clustering data space.
Figure 9:
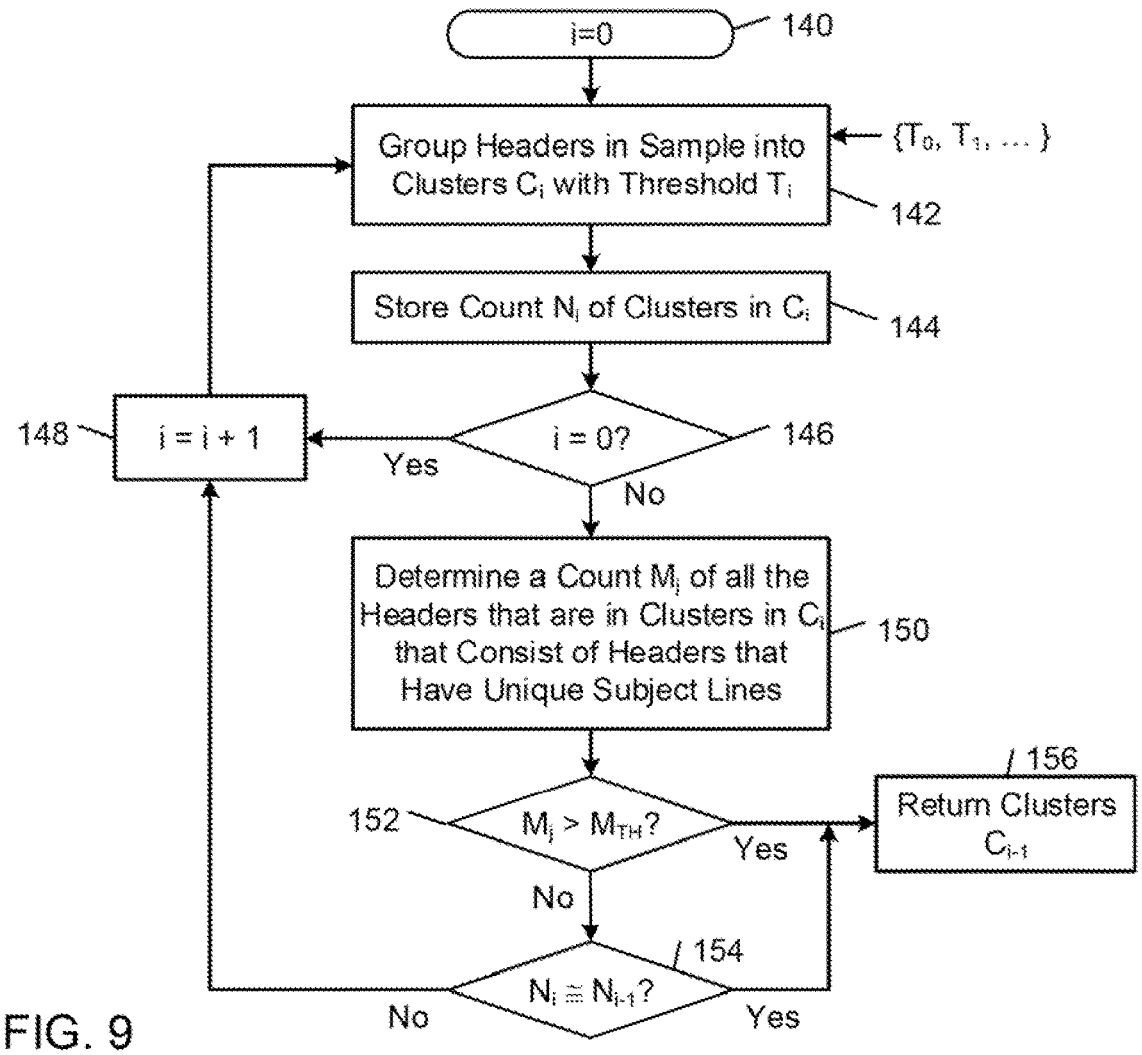
FIG. 9 is a flow diagram of an example of a process for grouping electronic message headers into clusters.

The computer apparatus groups the fetched headers into clusters based on a density based clustering process that correlates the clusters with respective dense regions in a clustering data space in which the fetched headers are separated from one another based on similarities between respective pairs of the fetched headers (FIG. 6, block 104). In general, any density based clustering process may be used. In some examples, the iterative clustering process described below in connection with FIGS. 8 and 9 is used to cluster the fetched headers. In other examples, the computer apparatus clusters the fetched headers using the Density-Based Spatial Clustering of Applications with Noise (DBSCAN) clustering process.

In some examples, the computer apparatus pre-processes the subject fields in the electronic message headers before grouping the headers into clusters. In some examples, the computer apparatus tokenizes the text-based contents of the subject fields in the headers by extracting contiguous strings of symbols (e.g., symbols representing alphanumeric characters) separated by white spaces. The contiguous symbol strings typically correspond to words and numbers. In some examples, the computer apparatus normalizes the contents of the subject fields by replacing capital letters with lower case letters, removing punctuation, and replacing tokens that match patterns for integers and real numbers in the electronic message headers with wildcard tokens. In some examples, integers are replaced with the wildcard token "INT" and real numbers are replaced with the wildcard token "FLOAT". The normalization of the subject fields improves the ability of the computer apparatus to discover purchase related electronic messages.

In some examples, the similarities between respective pairs of the fetched headers are determined based on measures of content similarity that compare similarity and diversity of the contents of pairs of strings in the headers of the electronic messages. In some of these examples, the subject field of each header is decomposed into a set of bigrams (i.e., two-word phrases). In some of these examples, the similarity measure corresponds to the Jaccard similarity coefficient, which measures similarity between two headers based on the size of the intersection divided by the size of the union of bigrams in the headers.

After the headers have been grouped into clusters, the computer apparatus performs the following processes for each of one or more of the clusters (FIG. 6, block 108).

The computer apparatus (e.g., a client network node) retrieves, from one or more of the messaging servers, a respective sample of the electronic messages in the population that are associated with the fetched headers in the cluster and stored on one or more of the network data storage systems (FIG. 6, block 108). In some examples, the computer apparatus retrieves a predetermined fixed number (e.g., 10, 5, or 1) of electronic messages for each cluster. In other examples, the computer apparatus retrieves a variable number of electronic messages for each cluster that depends on, for example, a statistical measure that characterizes the headers in the cluster.

The computer apparatus classifies, with a machine learning classifier, each electronic message in the retrieved sample with a respective label from a predefined set of labels comprising one or more purchase related labels and an associated confidence level to create a respective classification data set for the cluster (FIG. 6, block 110).

In some examples, the machine learning classifier is trained on a bag-of-words representation of purchase-related electronic messages using a supervised machine learning model (e.g., a logistic regression model or a naïve Bayes model). In some of these examples, the bag-of-words representation includes descriptive features that describe a particular purchase related electronic message. In some examples, each feature represents a string (e.g., a word) and the number of times the string appears in a predefined dictionary. In some examples, the dictionary includes: words or n-grams in the subject fields; aspects of the sender address (e.g., the text before the "@" sign); words in the message bodies; and number of images in the message bodies.

In some examples, the predefined set of labels consists of labels that indicate whether an electronic message is receipt-related or is not-receipt-related. An exemplary label set of this type is: {"receipt," "unknown"}. In other examples, the machine learning classifier is configured to classify an electronic message into different categories of purchase-related electronic messages. An exemplary label set of this type includes some or all of the following labels {"order notification," "shipping notification," "refund," "cancellation," "back order," "coupon," "promotion," "unknown"}.

In some examples, for each cluster, the machine learning classifier assigns to each of the sampled electronic messages a respective predicted label selected from the predefined set of labels and an associated confidence level for the predicted label. The respective classification data set for each cluster includes the set of predicted labels for the corresponding sample of electronic messages and their associated label confidence levels.

The computer apparatus assigns to each cluster a respective cluster label selected from the predefined set of labels based on at least one cluster classification rule that maps the respective classification data set to the respective cluster label (FIG. 6, block 112). In some examples, a cluster classification rule instructs the computer apparatus to label a cluster with a particular label based on one or more confidence factors, such as the number of the electronic messages in the corresponding sample that are assigned the same label, and the confidence levels associated with the assigned labels. According to an example of such a cluster classification rule, a cluster is labeled with a particular label if the particular label is assigned to all of the electronic messages in the sample with a respective confidence level that satisfies a threshold confidence level (e.g., 98% or higher). In some examples, if the confidence factors for a particular cluster do not satisfy the confidence thresholds, the electronic messages in the cluster are flagged for manual classification.

In some examples, in response to a determination that a predicted label for a particular electronic message is below a threshold confidence level, the computer apparatus flags the particular electronic message for manual classification. In some examples, the manually labeled electronic messages are used to extend the training set of the machine learning classifier.

For each cluster that is assigned a respective purchase related label, the computer apparatus automatically generates a respective filter for filtering purchase related electronic messages (FIG. 6, block 116). In some examples, the process of generating a filter involves identifying common substrings within the headers in the respective cluster, and generating a respective filter (e.g., a regular expression filter) based on the identified substrings. Each filter typically defines a matching pattern for a respective set of subject field strings in an electronic message. In some examples, sequence mining is used to create filters based on an analysis of n-grams (i.e., continuous sequences of n items for a given sequence of text) in headers. These examples involve determining respective counts of the n-grams that appear in the subject fields of the headers in each cluster, and incorporating into the respective filter one or more of the n-grams that are associated with prominent counts (e.g., the n-grams appear in a high percentage of the headers). In some of these examples, the sequence mining involves analyzing bigrams in the subject fields of the headers. An example of a method for automatically generating a respective filter from each cluster is described below in connection with FIG. 11.

After generating a respective filter for each purchase related cluster, a processor may install one or more of the filters in at least one network communication channel to select purchase related electronic messages from a set of electronic messages stored in association with respective user accounts on one or more network data storage systems managed by one or more messaging servers. In some examples, the computer apparatus implements an electronic message crawling engine that crawls the users' messaging accounts, and parses and evaluates contents of the electronic message headers. In some examples, the electronic message crawling engine parses the "From:" and "Subject:" header fields of the users' electronic messages and applies one or more of the generated filters (e.g., regular expression filters) to the parsed results to identify the purchase related headers that correspond to the target sender. The electronic message crawling engine then retrieves the complete electronic messages corresponding to the identified purchase related headers. In some examples, each filter is associated with a respective set of one or more electronic message body extraction parsers. In these examples, for each filter matched to a respective one of the electronic messages in the set, the computer apparatus attempts to parse the electronic message body with the one or more electronic message body extraction parsers that are associated with the matched filter. Exemplary message body extraction parsers are described in U.S. Pat. Nos. 8,844,010, 9,563,915, and 9,563,904.

Figure 7:
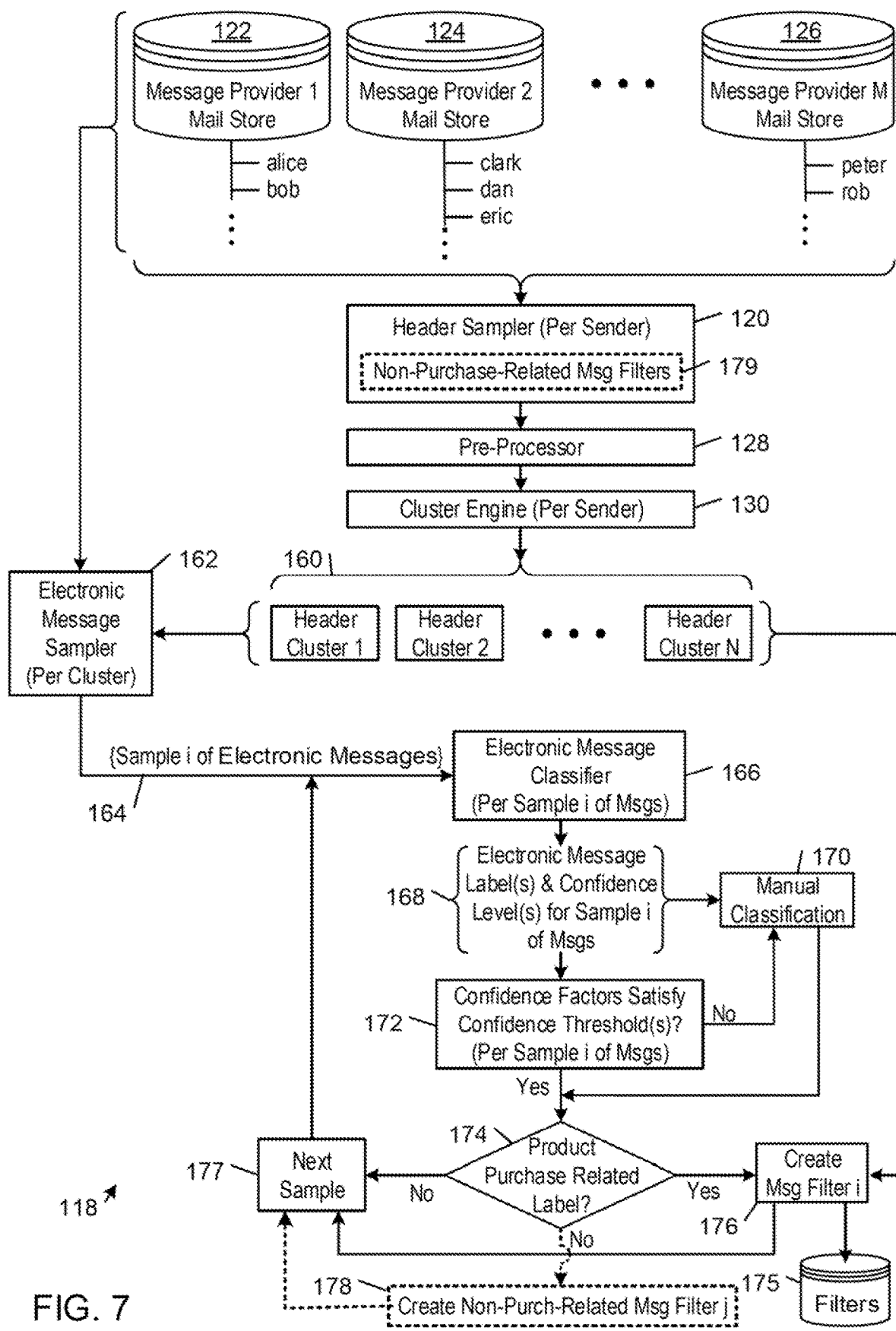
FIG. 7 is a diagrammatic view of an example of a system for generating an electronic message filter.

FIG. 7 shows a diagrammatic view of an example of a system 118 for building a message filter. The system 118 is operable to process a population of electronic messages transmitted between network nodes and stored in association with respective user accounts (e.g., alice, bob, clark, dan, eric, peter, and rob) on one or more network data storage systems 122, 124, 126 that are managed by respective messaging servers (e.g., Message Provider 1, Message Provider 2, . . . , Message Provider M).

The system 118 includes a header sampler 120 that fetches, for each of one or more senders, a respective sample of headers in the electronic message population that are associated with the sender and stored on one or more of the network data storage systems 122-126 across multiple of the user accounts. By fetching only a sample of the available headers instead of fetching all of the headers that are associated with the sender, the header sampler 120 improves the operation of the computer apparatus by reducing the processing resources, data storage resources, network resources, and production times needed to build electronic message filters. In other examples, the header sampler 120 fetches a sample of headers across sender domains.

A pre-processor 128 pre-processes the subject fields in the fetched sample of electronic message headers before the headers are grouped into clusters. In some examples, the pre-processor 128 performs one or more of the pre-processing steps described above in connection with the fetching process described above in connection with the method of FIG. 6. In some examples, the pre-processor 122 also de-duplicates the header data by treating all headers that have identical subject field content as a single instance. In this way, the pre-processor 128 further reduces the processing resources, data storage resources, network resources, and production times needed to build electronic message filters.

A cluster engine 130 groups the pre-processed headers in the sample into clusters by sender domain. In some examples, the grouping is based on a density based clustering process that correlates the clusters with respective dense regions in a clustering data space in which the pre-processed headers are separated from one another based on similarities between respective pairs of the pre-processed headers. In some examples, the similarities between respective pairs of the fetched headers are determined based on measures of content similarity that compare similarity and diversity of the contents of in the headers of the electronic messages. Exemplary header contents that are compared include the text (e.g., strings, n-grams, and/or words) in the subject field and the sender messaging address. In some of these examples, the similarities between the subject fields of two headers are measured using the Jaccard similarity coefficient, which measures similarity between two headers based on the size of the intersection divided by the size of the union of bigrams in the subject fields.

Referring to FIG. 8, the computed similarity scores between each pair of pre-processed headers determine how close the headers are to one another in the clustering data space 132. In some examples, the clustering process involves identifying connected components in a graph, where there is a link between circular nodes (representing headers) if their joint similarity score is greater than a threshold similarity level. FIG. 8 shows an example of a sample of twenty pre-processed headers that are grouped into twelve clusters (shown enclosed by dashed lines).

FIG. 9 shows an alternative clustering process that uses a variable similarity threshold to iteratively determine an optimal set of links between headers that inherently accounts for the respective variabilities in the machine-generated electronic messages generated by different senders.

The clustering process begins by setting the current similarity threshold level to an initial similarity threshold value $T_0$ (FIG. 9, block 140). In some examples, the similarity threshold corresponds to the Jaccard similarity measure. In some examples, the initial similarity threshold value $T_0$ is set to an initial level on a similarity scale of 0 to 1. In some of these examples, the initial similarity threshold $T_0$ is in the range $0.6 \leq T_0 \leq 0.8$.

Next, the headers in the sample are grouped into clusters in a set $C_0$ based on the current threshold level $T_0$ (FIG. 9, block 142), and a count $N_0$ of the clusters in the set of grouped clusters in the set $C_0$ is stored (FIG. 9, block 144). In some examples, the process of grouping the headers includes calculating similarity scores between respective pairs of the fetched messages headers based on comparisons of text (e.g., strings, n-grams, and/or words) in the subject fields of the respective message headers, and grouping the fetched headers into clusters based on comparisons of the calculated similarity scores with the current threshold level.

A second iteration of the process is repeated with another threshold $T_1$ (FIG. 9, blocks 146, 148, 142, 144). In some examples, for each iteration, the current threshold is lower than the preceding threshold. The set of thresholds $\{T_i\}$ may be determined dynamically (e.g., based on a mathematical formula or algorithm) or may be predetermined. In some examples, each successive threshold value is determined by decrementing the preceding threshold by a predetermined fixed amount (e.g. 0.1 on a similarity scale of 0 to 1).

In the second iteration of the clustering process, the headers in the sample are re-grouped into a set of clusters $C_1$ based on the current threshold level $T_1$ (FIG. 9, block 142) and a count $N_1$ of the clusters in the set of grouped clusters $C_2$ is stored (FIG. 9, block 144). The clusters in $C_1$ that consist of headers with unique subject lines are identified, and a count $M_1$ of all the identified headers in $C_1$ that consist of headers with unique subject lines is determined (FIG. 9, block 150). In some examples, a header is determined to have a unique subject line if the subject line does not have any words in common with the subject lines of the other headers in the cluster. In other examples, unique subject field lines are identified based on other text-based comparisons of the subject field content, such as comparisons between the strings or n-grams in the subject field lines of the headers in the cluster.

If the number $M_j$ of headers in the clusters that consist of headers that have unique subject lines is greater than a threshold $M_{TH}$ (FIG. 9, block 152), the number of unique subject lines is deemed to be too large and the clusters in the preceding set of clusters (i.e., $C_{i-1}$) are returned by the cluster engine 130 as the output cluster set 160 for the current sample of headers (FIG. 9, block 156). Also, if the count $N_i$ of the clusters in the current iteration and the count $N_{i-1}$ of the clusters in the preceding iteration satisfy a similarity criterion (FIG. 9, block 152), the number of clusters is deemed to have converged and the clusters in the preceding set of clusters (i.e., $C_{i-1}$) are returned by the cluster engine 130 as the output cluster set 160 for the current sample of headers (FIG. 9, block 156).

In some examples, the similarity criterion compares the ratio of the difference between the current and preceding cluster counts to the number of clusters in the preceding iteration. In some of these examples, the similarity criterion corresponds to:

$$\left|\frac{N_{i+1}+1}{N_i+1}-1\right|\leq\Delta,\text{ where }0\leq\Delta\leq1$$

If neither of the tests in blocks 152 and 154 is satisfied, another iteration of the clustering process is repeated with the next clustering threshold (FIG. 9, block 148).

Referring back to FIG. 7, after the cluster engine 130 has grouped the sample of headers into clusters 160, an electronic message sampler 162 selects a respective sample of the headers in each header cluster 160 and retrieves the complete electronic messages 164 that are associated with the selected headers from the message providers. The result is a respective sample i of electronic messages 164 for each cluster i of headers 160.

For each sample i of electronic messages 164, an electronic message classifier 166 classifies each of the constituent electronic messages in the sample. In some examples, the electronic message classifier 166 is a machine learning classifier of the type described above in connection with FIGS. 4 and 6. The machine learning classifier assigns to the electronic messages in each sample 164 a respective set 168 of labels and associated confidence levels. In some examples, in response to a determination that a predicted label for a particular electronic message is below a threshold confidence level, the computer apparatus flags the particular electronic message for manual classification (FIG. 7, block 170). In some examples, the manually labeled electronic messages are used to train the electronic message classifier 166.

In some examples, a cluster classification rule instructs the computer apparatus to label a cluster with a particular label based on one or more confidence factors, such as the number of the electronic messages in the corresponding sample that are assigned the same label and the confidence levels associated with the assigned labels. In some examples, if the confidence factors do not satisfy the one or more confidence thresholds (FIG. 7, block 172), the electronic messages in the cluster are flagged for manual classification (FIG. 7, block 170).

For each cluster that is assigned a respective purchase related label (FIG. 7, block 174), the computer apparatus automatically generates a respective filter 175 for filtering purchase related electronic messages (FIG. 7, block 176).

In the illustrated example, if a cluster is not assigned a respective purchase related label (FIG. 7, block 174), the computer apparatus proceeds directly to process the next sample i=i+1 of electronic messages 164 for the next cluster of headers 160 (FIG. 7, block 177). In this process, the computer apparatus repeats the cluster labeling process based on the classification of the constituent electronic messages in the next sample i=i+1 (FIG. 7, blocks 166-172).

In an alternative example, instead of proceeding directly to process the next sample i=i+1 of electronic messages 164 (FIG. 7, block 177), the computer apparatus automatically generates a respective filter 179 for filtering non-product-purchase related electronic messages (FIG. 7, block 178) for each cluster that is not assigned a respective purchase related label. In some of these examples, the non-product-purchase related electronic message filters 179 are installed at the front-end of the message filter building system 118, either as a component of the header sampler 120 (as shown in FIG. 7) or as part of a separate pre-filter. The non-product-purchase related electronic message filters 179 are used to filter-out headers of non-product-purchase related electronic messages that are fetched by the header sampler 120. In this way, electronic messages with headers that correspond to previously identified non-product-purchase related electronic messages can be filtered out to further reduce the processing resources, data storage resources, network resources, and production times needed to build purchase related electronic message filters.

Figure 10:
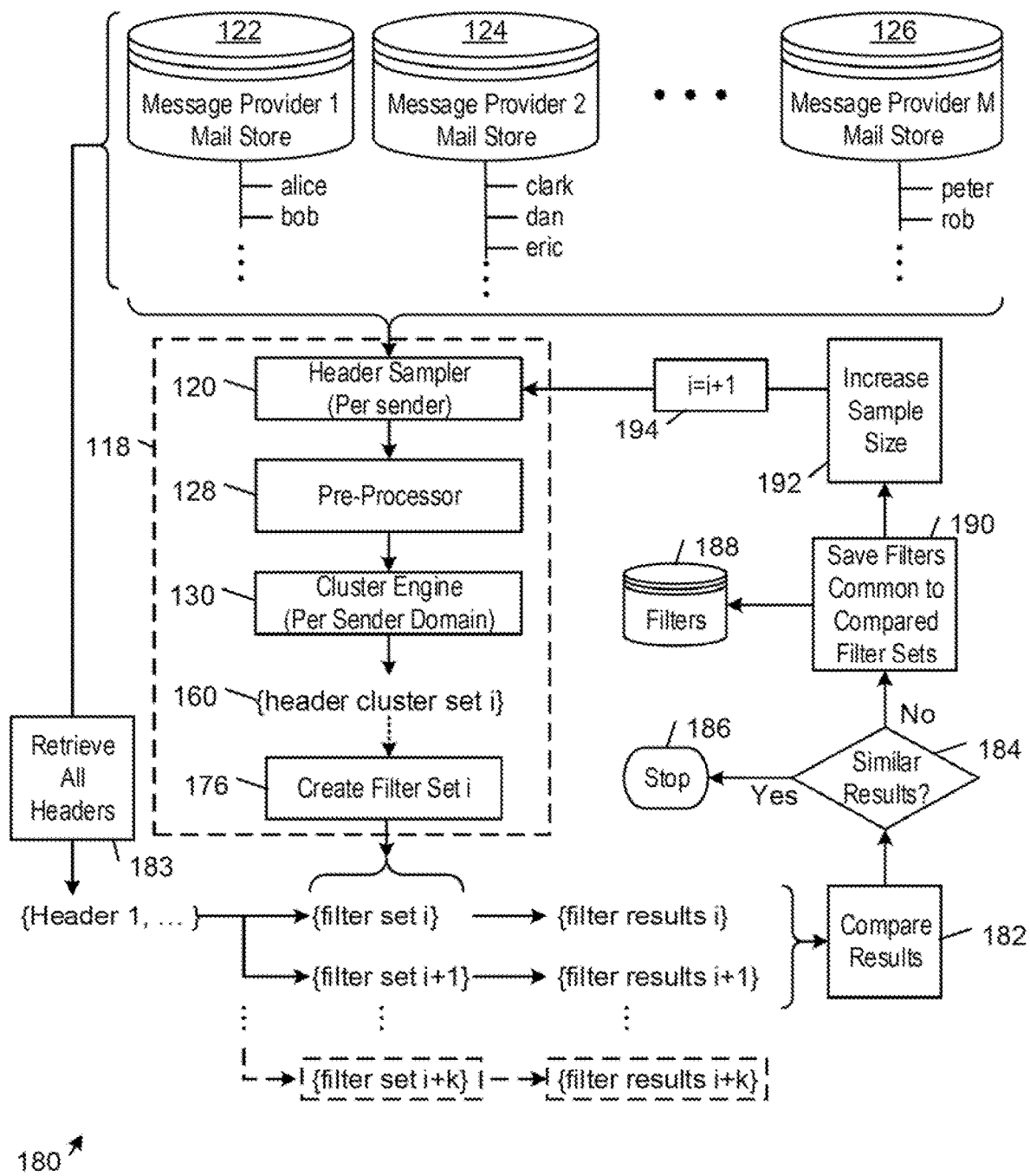
FIG. 10 is a diagrammatic view of an example of a system for generating an electronic message filter.

FIG. 10 shows an example of a message filter building system 180 that incorporates elements of the message filter building system 118 of FIG. 7, and additionally implements an iterative process for building filters from samples of the fetched header data.

In this example, the header sampler 120 fetches, for each of one or more senders, a respective sample of the headers in the electronic message population that are associated with the sender and stored on one or more of the network data storage systems 122-126 across multiple user accounts. In other examples, the header sampler 120 fetches a sample of headers across sender domains. The pre-processor 128 pre-processes the subject fields in the fetched sample of electronic message headers before the headers are grouped into clusters. The cluster engine 130 groups the pre-processed headers into clusters 160 based on a density based clustering process that correlates the clusters with respective dense regions in a clustering data space in which the pre-processed headers are separated from one another based on similarities between respective pairs of the pre-processed headers. For each set i of header clusters 160 that is assigned a respective purchase related label, the computer apparatus automatically generates a respective set i of filters for filtering purchase related electronic messages in accordance with the method described above in connection with FIG. 7 (see, e.g., FIG. 7, block 176).

In the first iteration of the filter building process, the message filter building system 180 builds a respective first set of filters (i.e., {filter set i}) for each sender from a respective first sample of the headers that are associated with the sender.

The process is repeated for a respective second sample of headers in the electronic message population for each sender. In this second iteration of the filter building process, the message filter building system 180 builds a respective second set of filters (i.e., {filter set i+1}) for each sender from a respective second sample of the headers that are associated with the sender.

The filter results are compared on a per sender basis (FIG. 10, block 182). In this process, for each sender, the computer apparatus retrieves a respective set of all the headers in the population that correspond to the sender (FIG. 10, block 183). The respective first and second sets of filters (i.e., {filter set i} and {filter set i+1}) for the sender are then applied to the respective set all the headers in the population that correspond to the sender to produce {filter results i} and {filter results i+1}.

If the filtering results are similar (FIG. 10, block 184), the filter building process ends (FIG. 10, block 186). In some examples, the similarity between the first and second filtering results is determined based on a comparison of the respective numbers of the retrieved headers in the complete set of headers that are not matched to any filter in the first and second sets of filters. If the numbers of headers that are unmatched by the first and second sets of filters are similar, the filter sets are deemed to be sufficiently similar and the filter building process stops (FIG. 10, block 186).

If the filter results are not similar (FIG. 10, block 184), the filter building process continues as follows. In some examples, filters that are shared between the compared filter sets are saved in memory 188 for use in filtering electronic messages (FIG. 10, block 190). The previous header sample size is increased (FIG. 10, block 192), and another iteration of the filter building process is performed (FIG. 10, block 194) using the larger respective sample of headers for each sender.

Figure 11:
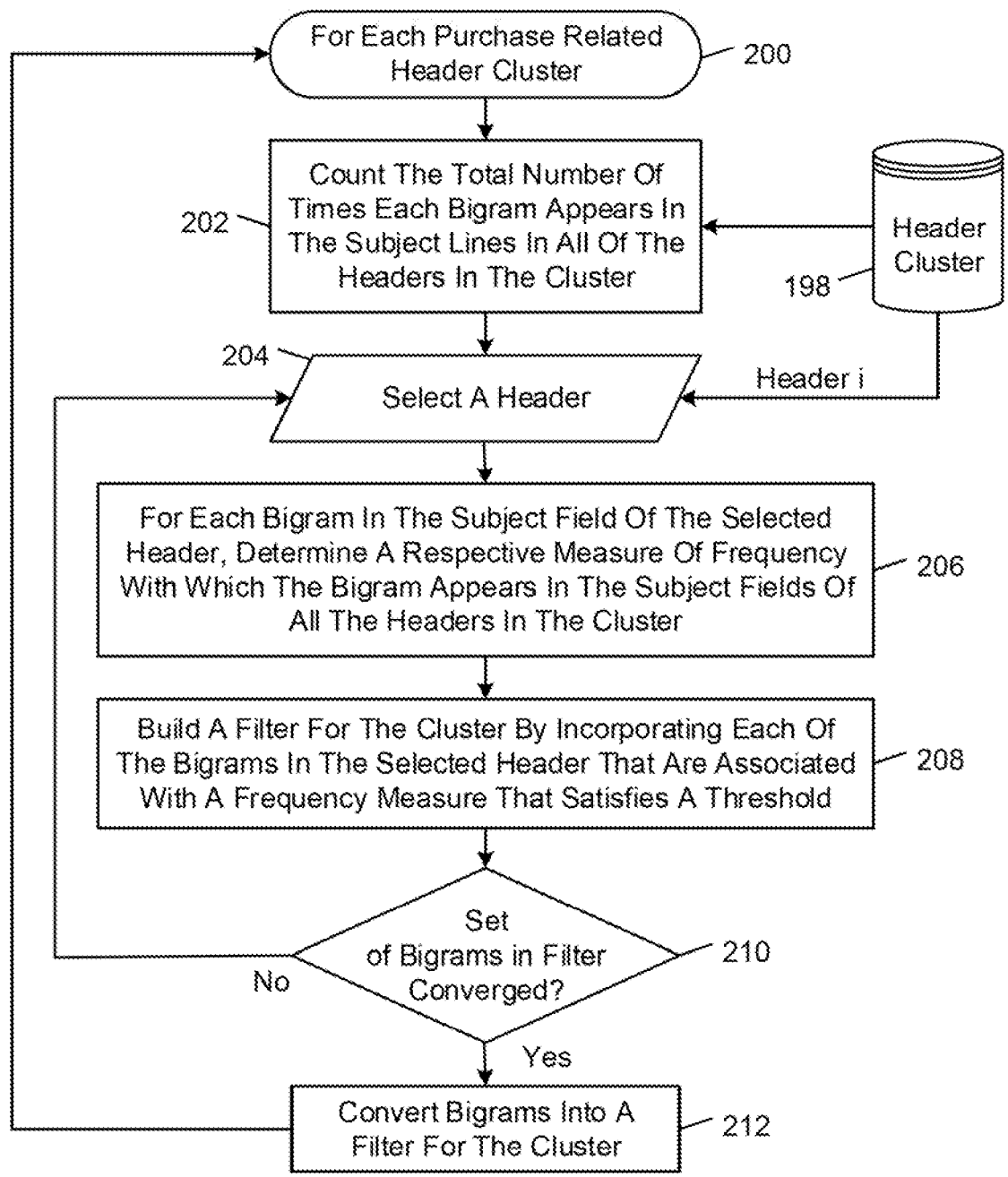
FIG. 11 is a flow diagram of an example of a process for generating an electronic message filter.

FIG. 11 shows a process for generating a respective filter for a cluster 198 of headers. In some examples, the computer apparatus performs this process for each purchase related cluster (e.g., each cluster that is labeled with a purchase related label) (FIG. 11, block 200). The computer apparatus counts the total number of times each bigram appears in the subject lines of all the headers in the cluster 198 (FIG. 11, block 202). The computer apparatus selects a header from the cluster 198 (FIG. 11, block 204). For each bigram in the subject field of the selected header, the computer apparatus determines a respective measure of frequency with which the bigram appears in the subject fields of the headers (FIG. 11, block 206). Examples of such frequency measures include a ratio that measures the number of subject fields that contain the bi-gram divided by the number of subject fields that do not contain the bigram, a proportion that measures the number the subject fields that contain the bigram divided by the total number of subject fields, and a rate that measures the frequency with which a subject field containing the bigram appears in the subject fields. The computer apparatus builds a filter for the cluster by incorporating each of the bigrams in the selected header that is associated with a respective frequency measure that satisfies a threshold (e.g., 80%) (FIG. 11, block 208). The computer apparatus determines if the set of bigrams that have been incorporated into the filter for the cluster has converged (FIG. 11, block 210). In some examples, the set of bigrams is determined to have converged if the set of bigrams did not change in the last iteration. If the set of bigrams has converged (FIG. 11, block 210), the bigrams in the set are converted into a filter for the cluster (FIG. 11, block 212). In some examples, the bigrams are converted into one or more regular expressions that define the filter. If the set of bigrams has not converged (FIG. 11, block 210), the process is repeated for another header selected from the cluster 198 (FIG. 11, blocks 204-210).

In other examples of the filter building process of FIG. 11, instead of using bigrams, the analysis of the header subject fields is performed with respect to other textual characteristics, including strings, n-grams, and words appearing in the subject fields.

III. Exemplary Computer Apparatus

Computer apparatus are specifically programmed to provide improved processing systems for performing the functionality of the processes described herein. In some examples, the process of building a electronic message filter and the process of filtering electronic messages with one or more electronic message filters are performed by separate and distinct computer apparatus. In other examples, the same computer apparatus performs these processes.

Figure 12:
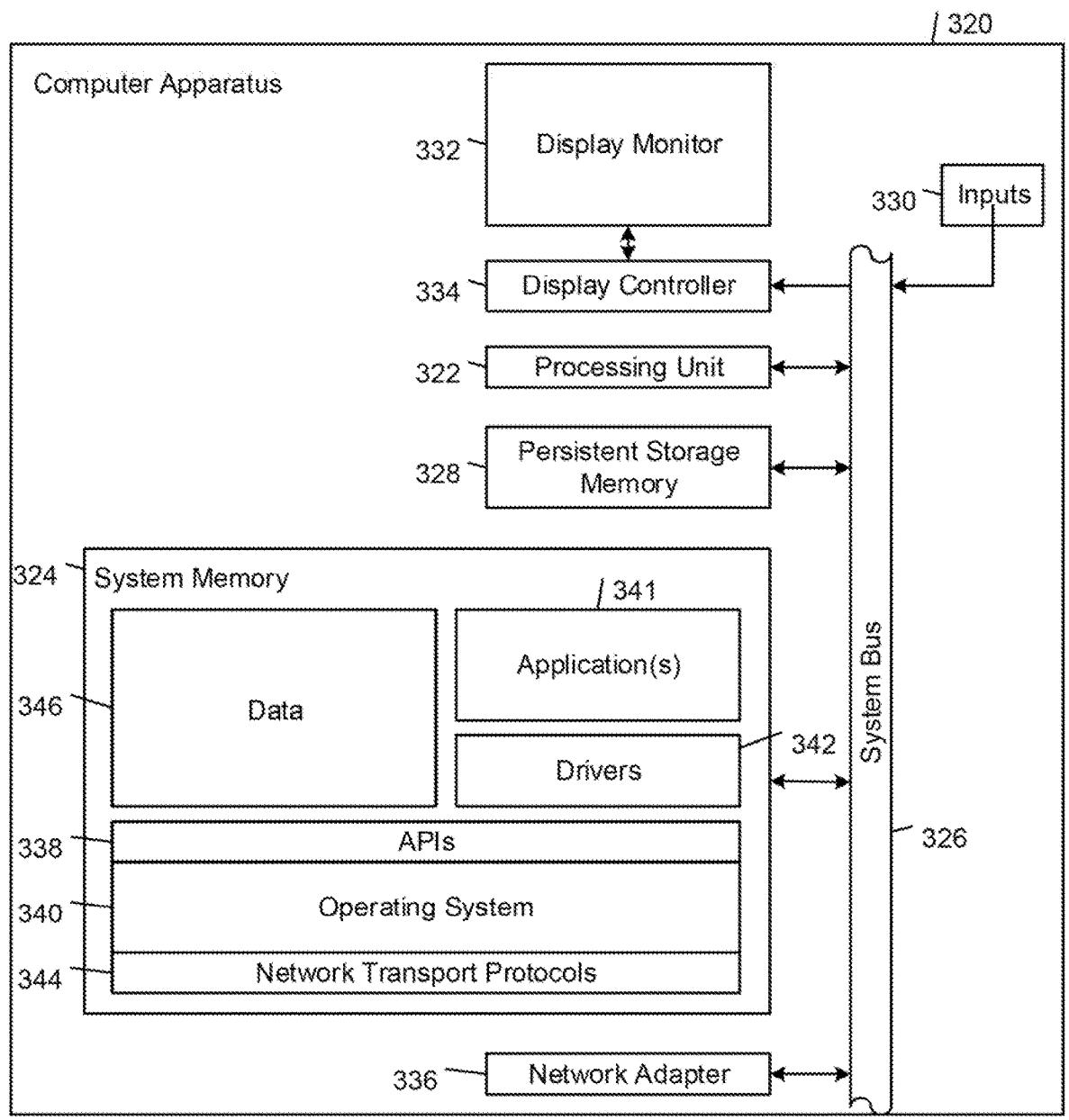
FIG. 12 is a block diagram of an example of computer apparatus.

FIG. 12 shows an example embodiment of computer apparatus that is implemented by a computer system 320. The computer system 320 includes a processing unit 322, a system memory 324, and a system bus 326 that couples the processing unit 322 to the various components of the computer system 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer system 320, and a random access memory (RAM). The system bus 326 may be a memory bus, a peripheral bus or a local bus, and may be compatible with any of a variety of bus protocols, including PCI, VESA, Microchannel, ISA, and EISA. The computer system 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer system 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer system 320 also may include other input/output hardware (e.g., peripheral output devices, such as speakers and a printer). The computer system 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer system 320 to perform one or more of the process of building an electronic message filter and the process of filtering electronic messages with an electronic message filter, drivers 342 (e.g., a GUI driver), network transport protocols 344, and data 346 (e.g., input data, output data, program data, a registry, and configuration settings).

IV. Conclusion

The embodiments described herein provide improved systems, methods, and computer-readable media for building purchase related electronic message filters and filtering purchase related electronic messages.

Other embodiments are within the scope of the claims.

The invention claimed is:

1. A method of generating filters operable to filter a population of electronic messages transmitted between network nodes and stored in association with respective user accounts on one or more network data storage systems managed by one or more messaging servers, each electronic message being associated with a respective sender, a respective header, and a respective body, the method comprising:

fetching, for each sender, a respective sample of electronic message headers in the electronic message population that are associated with the sender and stored on one of more of the network data storage systems across multiple of the user accounts;

processing, by a processor, subject fields in the fetched sample of electronic message headers to obtain measures of content similarity that compare similarity and diversity of contents in the subject fields in the fetched sample of the electronic message headers;

grouping, by sender domain, ones of the headers in the sample into clusters, wherein the grouping is based on a density based clustering process that correlates the clusters with respective dense regions in a clustering data space in which the headers in the sample are separated from one another based on the similarities and diversities between respective pairs of the headers in the sample;

classifying, by an electronic message classifier, a respective sample of electronic messages selected from each cluster of headers, wherein the electronic message classifier assigns to electronic messages in the sample respective labels based on a predefined set of electronic message labels and associated confidence levels; and for each cluster that is assigned a purchase related electronic message label, automatically generating a respective filter for filtering purchase related electronic messages.

2. The method of claim 1, wherein the grouping comprises calculating similarity scores between respective pairs of the fetched message headers based on comparisons of strings in the subject fields of the respective message headers, and grouping the fetched headers into clusters based on the calculated similarity scores.

3. The method of claim 2, wherein the grouping comprises applying a similarity threshold to the calculated similarity scores to generate the clusters of the fetched message headers.

4. The method of claim 3, wherein the grouping comprises iteratively adjusting the similarity threshold and grouping the fetched message headers into clusters based on the adjusted similarity threshold until a count of the clusters is determined to have converged.

5. The method of claim 4, wherein the adjusting comprises adjusting the similarity threshold progressively lower from an initial similarity threshold value.

6. The method of claim 4, wherein, for at least one iteration of the adjusting, the grouping comprises requiring that the headers in each cluster have words in common.

7. The method of claim 1, wherein the grouping is performed without regard to the bodies associated with the headers in the sample.

8. The method of claim 1, wherein the classifying of each electronic message is based on contents of the header and the body that are respectively associated with the electronic message.

9. The method of claim 1, wherein the generating of a respective filter comprises identifying common substrings within the headers in the respective cluster, and generating a respective filter based on the identified substrings.

10. The method of claim 9, wherein the generating of a respective filter comprises determining respective counts of bigrams appearing in the headers in the respective cluster, and incorporating one or more of the bigrams associated with prominent counts into the respective filter rule.

11. The method of claim 9, wherein each of respective ones of the filter rules defines a matching pattern for a respective set of subject field strings in an electronic message.

12. The method of claim 1, wherein the installing comprises installing one or more of the filters between a client network node and one or more of the messaging servers.

13. The method of claim 1, further comprising de-duplicating the fetched sample of electronic message headers by treating all headers that have identical subject field content as a single instance.

14. A method of generating filters operable to filter a population of electronic messages transmitted between network nodes and stored in association with respective user accounts on one or more network data storage systems managed by one or more messaging servers, each electronic message being associated with a respective sender, a respective header, and a respective body, the method comprising:

fetching, for each of one or more senders, a sample of the headers in the electronic message population that are associated with the sender and stored on one or more network data storage systems;

processing, by a processor, the headers including the subject fields in the fetched sample of electronic message headers;

grouping, by a clustering engine, the processed headers into header clusters based on a density based clustering process that correlates the clusters with respective dense regions in a clustering data space in which the processed headers are separated from one another based on similarities between respective pairs of processed headers;

selecting a respective sample of the headers in each header cluster;

retrieving a respective electronic message for each sample of the headers in each header cluster;

labeling, by an electronic message classifier, the retrieved electronic messages in each header sample with respective labels and associated confidence levels for each cluster that is assigned a purchase related label, automatically generating a respective filter for filtering purchase related electronic messages.

15. The method of claim 14, further comprising, by a header sampler, fetching a sample of headers across sender domains.

16. The method of claim 14, wherein the grouping is performed without regard to the message bodies associated with the headers in the sample.

17. The method of claim 14, wherein the classifying of each electronic message is based on contents of the message header and the message body that are respectively associated with the electronic message.

18. The method of claim 14, wherein the similarities between respective pairs of the fetched headers are determined based on measures of content similarity that compare similarity and diversity of contents of pairs of strings in the headers of the electronic messages.

19. A computer-readable data storage apparatus comprising at least one memory component storing executable instructions that are operative to be executed by a computer to generate filters to filter a population of electronic messages transmitted between network nodes and stored in association with respective user accounts on one or more network data storage systems managed by one or more messaging servers, each electronic message being associated with a respective sender, a respective header, and a respective body, wherein the at least one memory component comprises:

executable instructions to fetch, for each of one or more senders, a respective sample of the headers in the electronic message population that are associated with the sender and stored on one or more of the network data storage systems across multiple user accounts;

executable instructions to group the headers into clusters based on a density based clustering process that correlates the clusters with respective dense regions in a clustering data space in which the headers are separated from one another based on similarities between respective pairs of the pre-processed headers;

executable instructions to build a respective first set of filters for each sender from a respective first sample of the headers that are associated with the sender;

executable instructions to build a respective second set of filters for each sender from a successive sample of the headers that are associated with the sender;

executable instructions to retrieve, for each sender, a respective set of all headers in the population that corresponds to the sender;

executable instructions to apply, on a per sender basis, the respective first and second sets of filters to the respective set of all headers in the population that corresponds to the respective sender to produce filtering results for the first set of filters and filtering results for the second set of filters; and executable instructions to compare the filtering results for the first and second sets of filters and determine whether the filtering results are similar or dissimilar.

20. The computer-readable data storage apparatus of claim 19, comprising executable instructions to increase the header sample size relative to a preceding header sample size, build different respective sets of filters for each sender from first and second samples of the headers that are associated with the sender, and compare filtering results for the first and second sets of filters.

* * * * *